(12) United States Patent
Pettis

(10) Patent No.: US 7,582,341 B2
(45) Date of Patent: *Sep. 1, 2009

(54) ELASTOMER AND POLYOLEFIN RESIN BASED FILMS AND ASSOCIATED METHODS

(75) Inventor: Rodney L. Pettis, Spartanburg, SC (US)

(73) Assignee: Exopack Technology LLC, Spartanburg, SC (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/352,066

(22) Filed: Feb. 10, 2006

(65) Prior Publication Data

US 2006/0127657 A1 Jun. 15, 2006

Related U.S. Application Data

(63) Continuation-in-part of application No. 10/760,337, filed on Jan. 20, 2004, now Pat. No. 7,083,838.

(60) Provisional application No. 60/505,371, filed on Oct. 2, 2003.

(51) Int. Cl.
  *B32B 27/28* (2006.01)
  *B32B 27/32* (2006.01)
(52) U.S. Cl. ............... 428/34.9; 428/35.9; 428/515
(58) Field of Classification Search ............... 428/34.9, 428/35.9, 339, 500, 515–516, 520–521
See application file for complete search history.

(56) References Cited

U.S. PATENT DOCUMENTS

| 4,493,127 | A | | 1/1985 | Blanke, Jr. et al. | |
|---|---|---|---|---|---|
| 4,510,205 | A | * | 4/1985 | Weemes et al. | 428/483 |
| 4,542,886 | A | | 9/1985 | Yoshimura et al. | 264/22 |
| 4,636,442 | A | * | 1/1987 | Beavers et al. | 428/480 |
| 4,756,629 | A | | 7/1988 | Tilman et al. | |
| 4,897,174 | A | | 1/1990 | Wang et al. | |
| 4,946,289 | A | | 8/1990 | Bolling et al. | |

(Continued)

FOREIGN PATENT DOCUMENTS

GB    2 351 039 A    12/2000

(Continued)

OTHER PUBLICATIONS

E.I. DuPont de Nemours and Company, Inc., DuPont Elvax 3165 resin Product Data Sheet, DuPont Packaging & Industrial Polymers, Jan. 8, 2007.*

(Continued)

*Primary Examiner*—David R Sample
*Assistant Examiner*—Sophie Hon
(74) *Attorney, Agent, or Firm*—Stoel Rives LLP

(57) ABSTRACT

A packaging film and related methods of manufacture are provided. The packaging film can have enhanced optical and mechanical properties so that a product surrounded by the film is clearly visible through the film and the film is sufficiently durable to be useful as packaging film. The packaging film can include a first layer of elastomer; a second layer of polyolefin having a first surface abuttingly contacting a first surface of the elastomer; and a third layer of elastomer abuttingly contacting a second surface of the polyolefin so that the second layer of polyolefin is positioned between the first and third layers of elastomer.

23 Claims, 14 Drawing Sheets

U.S. PATENT DOCUMENTS

| | | | |
|---|---|---|---|
| 4,952,441 A | 8/1990 | Bose et al. | |
| 4,994,324 A | 2/1991 | Bose et al. | |
| 5,038,009 A | 8/1991 | Babbitt | |
| 5,051,284 A | 9/1991 | Johansson et al. | |
| 5,085,927 A * | 2/1992 | Dohrer | 428/220 |
| 5,106,677 A | 4/1992 | Yeh et al. | |
| 5,158,836 A | 10/1992 | Schirmer et al. | |
| 5,171,594 A | 12/1992 | Babbitt | |
| 5,219,666 A | 6/1993 | Schirmer et al. | |
| 5,272,016 A * | 12/1993 | Ralph | 428/516 |
| 5,319,033 A | 6/1994 | Trepka et al. | |
| 5,345,399 A | 9/1994 | Collins | |
| 5,456,979 A | 10/1995 | Schirmer et al. | |
| 5,482,376 A | 1/1996 | Mosely et al. | |
| 5,488,220 A | 1/1996 | Freeks et al. | |
| 5,523,136 A | 6/1996 | Fischer et al. | |
| 5,529,396 A | 6/1996 | Pryor et al. | |
| 5,558,438 A | 9/1996 | Warr | |
| 5,560,296 A | 10/1996 | Adams | |
| 5,593,229 A | 1/1997 | Warr | |
| 5,601,369 A | 2/1997 | Mosely et al. | |
| 5,611,626 A | 3/1997 | Warr | |
| 5,658,625 A | 8/1997 | Bradfute et al. | |
| 5,663,002 A | 9/1997 | Schirmer et al. | |
| 5,728,037 A | 3/1998 | Pryor et al. | |
| 5,756,577 A | 5/1998 | Gutierrez-Villarreal | |
| 5,770,839 A | 6/1998 | Ruebush et al. | |
| 5,783,270 A | 7/1998 | Fischer et al. | |
| 5,834,077 A | 11/1998 | Babrowicz | |
| 5,837,355 A | 11/1998 | Hayai | |
| 5,871,790 A | 2/1999 | Monier et al. | |
| 5,972,519 A | 10/1999 | Niessner et al. | |
| 6,019,713 A | 2/2000 | Scypinski et al. | |
| 6,022,612 A | 2/2000 | Wilkie | |
| 6,046,443 A | 4/2000 | Ackerman et al. | |
| 6,060,136 A * | 5/2000 | Patrick et al. | 428/35.2 |
| 6,065,871 A | 5/2000 | Warr | |
| 6,181,446 B1 * | 1/2001 | Cox et al. | 359/3 |
| 6,231,232 B1 | 5/2001 | Warr | |
| 6,248,850 B1 | 6/2001 | Arai | |
| 6,255,388 B1 | 7/2001 | Yamada et al. | |
| 6,270,866 B1 | 8/2001 | Okuda et al. | |
| 6,299,351 B1 | 10/2001 | Warr | |
| 6,375,981 B1 | 4/2002 | Gilleland et al. | |
| RE37,699 E | 5/2002 | Bradfute et al. | |
| 6,402,379 B1 | 6/2002 | Albright | |
| 6,417,307 B1 | 7/2002 | Oi et al. | |
| 6,417,308 B2 | 7/2002 | Arai et al. | |
| 6,479,138 B1 | 11/2002 | Childress | |
| 6,517,950 B1 | 2/2003 | Patrick et al. | |
| 6,528,088 B1 | 3/2003 | Gilleland et al. | |
| 6,609,999 B2 | 8/2003 | Albright | |
| 6,893,686 B2 | 5/2005 | Egan | |
| 7,083,838 B2 * | 8/2006 | Pettis | 428/34.9 |
| 2002/0088533 A1 * | 7/2002 | Mercure et al. | 156/179 |
| 2004/0038792 A1 | 2/2004 | Albright | |
| 2004/0091648 A1 | 5/2004 | Hartzell et al. | |
| 2004/0136616 A1 | 7/2004 | Allen et al. | |
| 2004/0137206 A1 | 7/2004 | Pettis | |
| 2004/0175060 A1 | 9/2004 | Woodham et al. | |
| 2004/0228547 A1 | 11/2004 | Hartzell et al. | |
| 2005/0008736 A1 | 1/2005 | Egan | |

FOREIGN PATENT DOCUMENTS

| | | |
|---|---|---|
| WO | WO 00/53429 A1 | 9/2000 |
| WO | WO 01/94451 A2 | 12/2001 |

OTHER PUBLICATIONS

E.I. DuPont de Nemours and Company, Inc., DuPont Elvax 3170 resin Product Data Sheet, DuPont Packaging & Industrial Polymers, Jan. 8, 2007.*

E.I. DuPont de Nemours and Company, Inc., DuPont Elvax 3182 resin Product Data Sheet, DuPont Packaging & Industrial Polymers, Jan. 8, 2007.*

Jan. H. Schut, Polystyrene Blown Film Starts to Get Some Respect, Plastics Technology, Nov. 2002, available at www.plasticstechnology.com/articles/200011fa1.html.

* cited by examiner

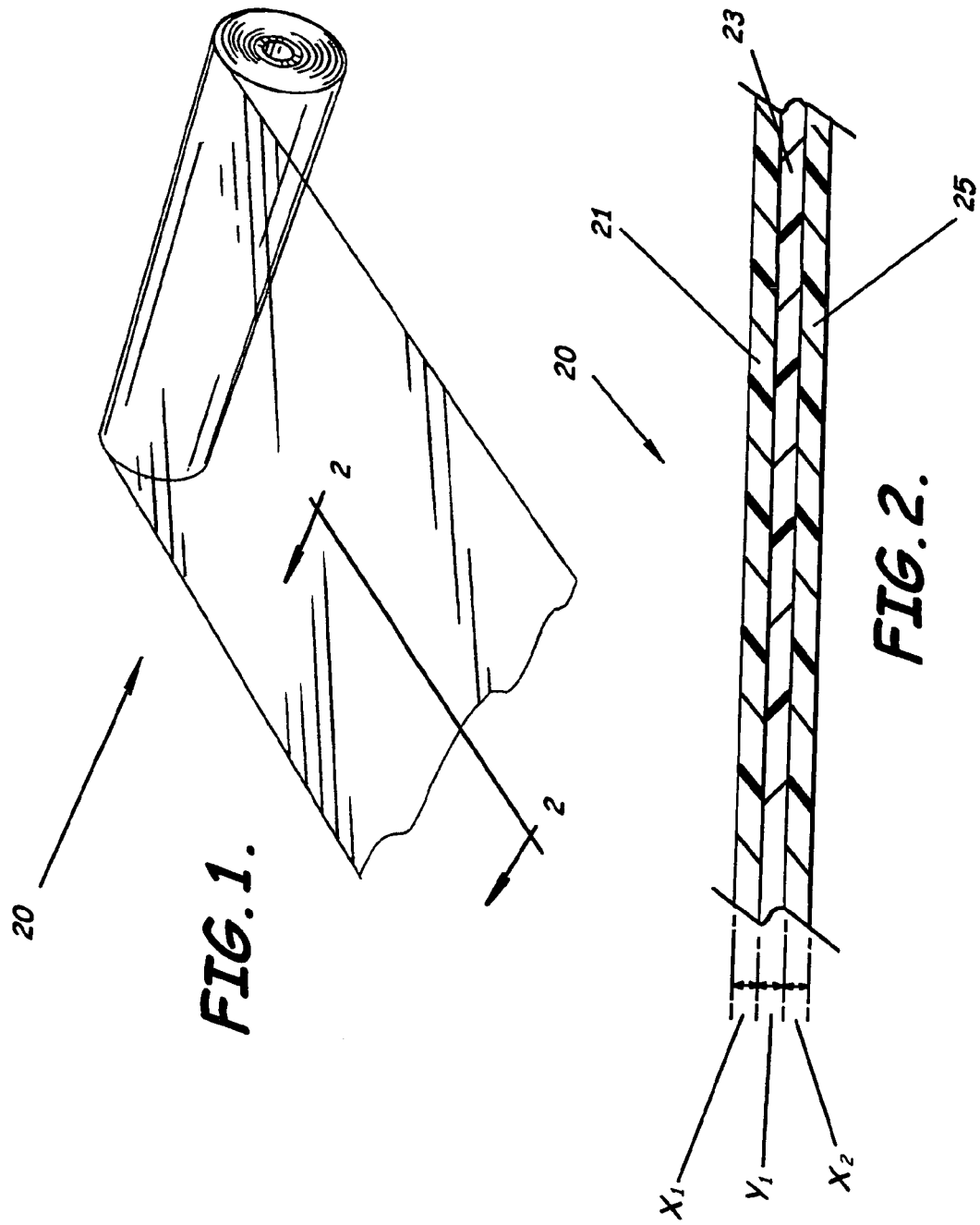

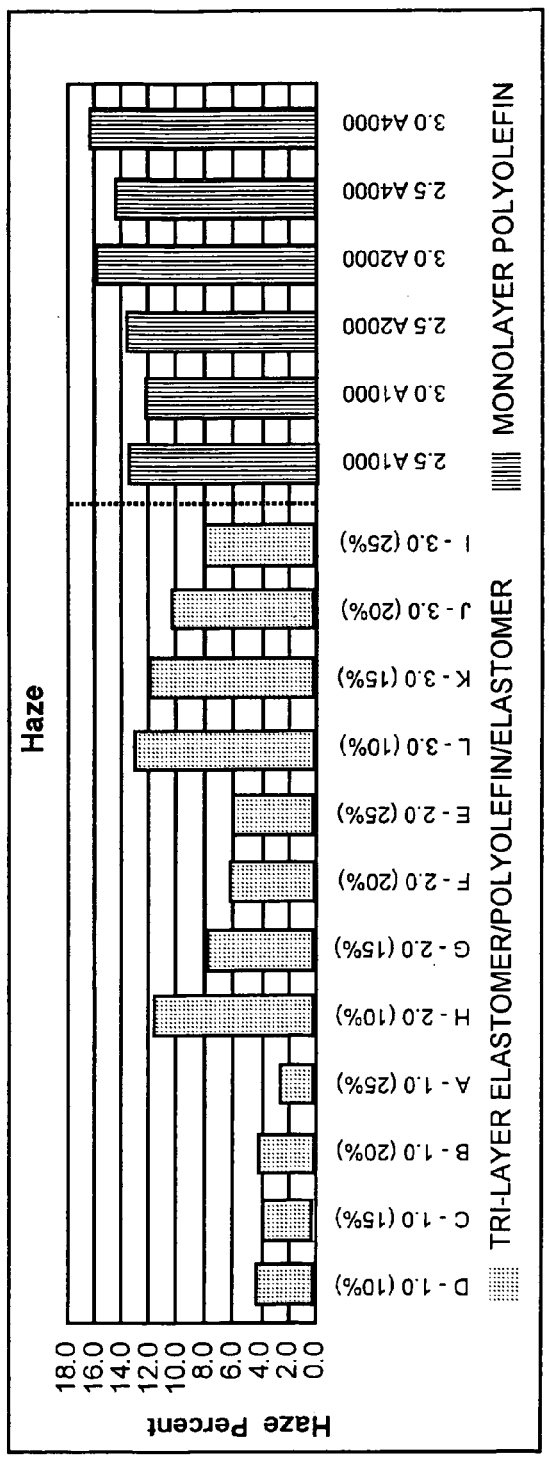
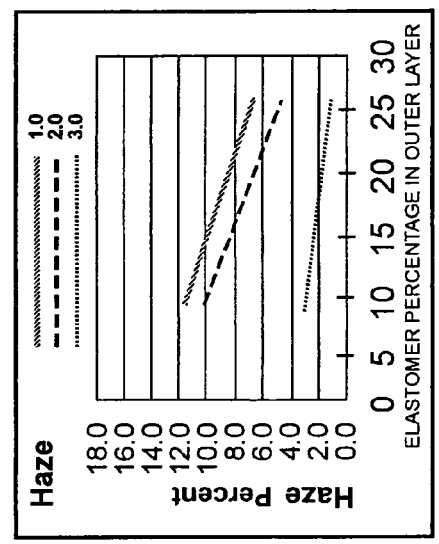
FIG. 5A.
FIG. 5B.

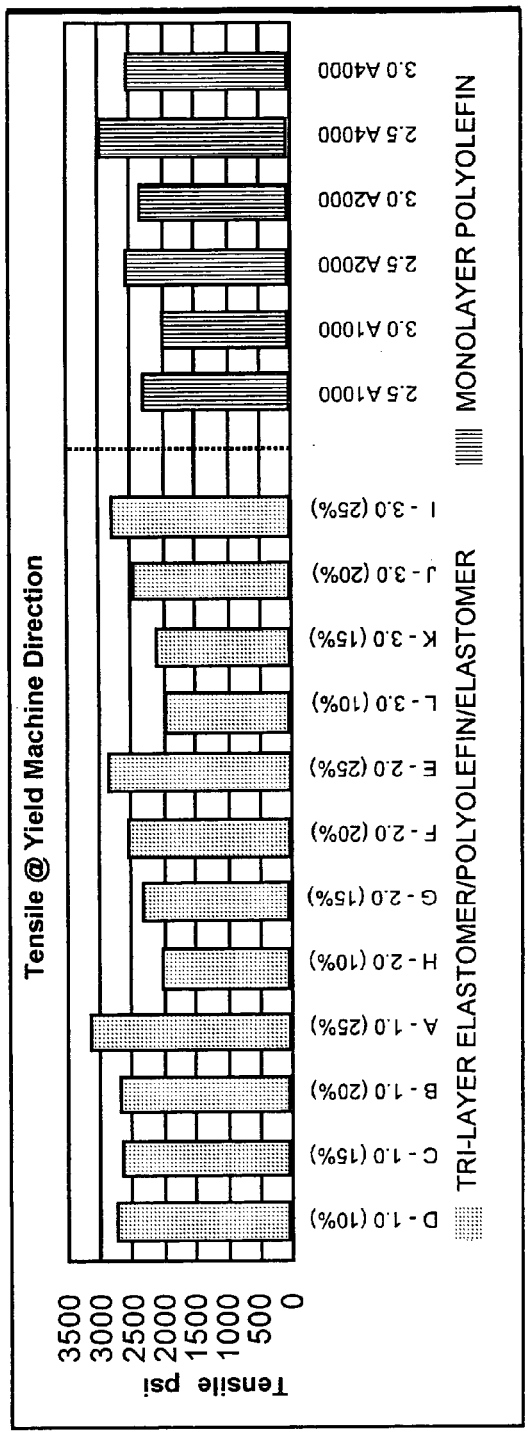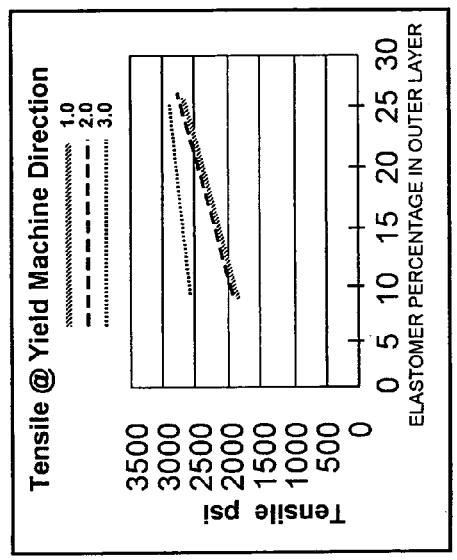
FIG. 9A.
FIG. 9B.

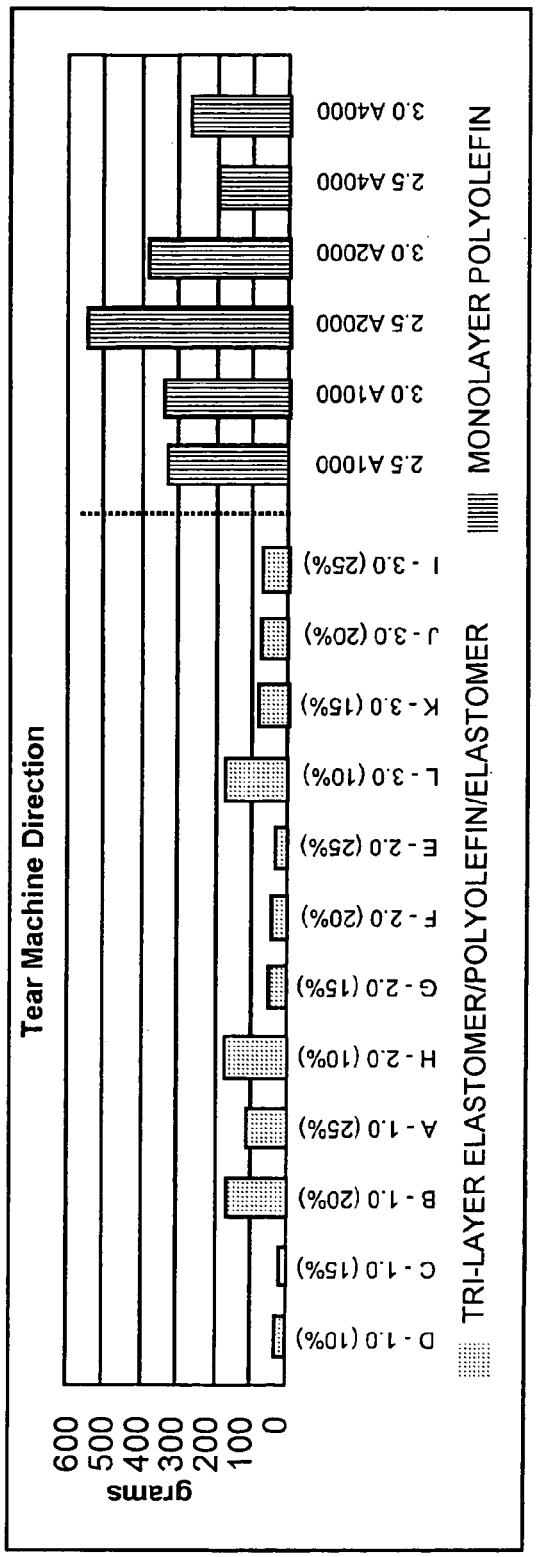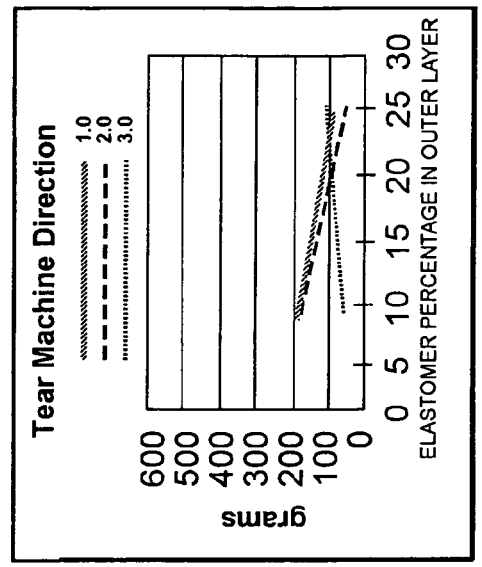
FIG. 11A.
FIG. 11B.

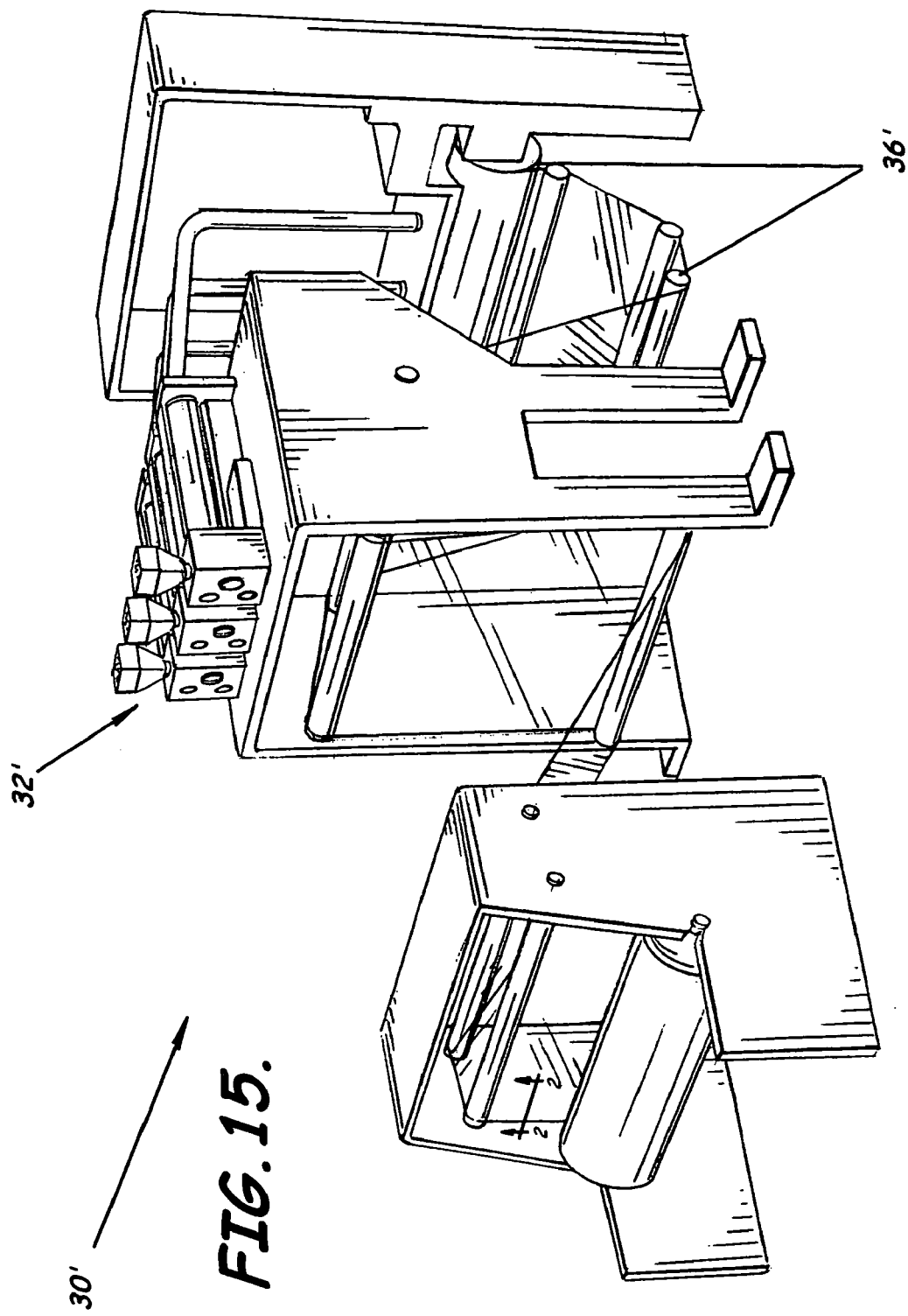

ELASTOMER AND POLYOLEFIN RESIN BASED FILMS AND ASSOCIATED METHODS

RELATED APPLICATIONS

This application is a continuation-in-part application which claims the benefit of and priority to U.S. Non-Provisional patent application Ser. No. 10/760,337, filed on Jan. 20, 2004, now U.S. Pat. No. 7,083,838, which claims the benefit of and priority to U.S. Provisional Application No. 60/505,371, filed on Oct. 2, 2003, incorporated herein by reference in their entirety.

BACKGROUND OF THE INVENTION

1. Field of the Invention

The present invention relates to multilayer films, specifically multilayer films that also can be used as packaging films. More specifically, the present invention is directed to multilayer films having relatively low haze and high gloss properties and associated methods of forming and using same.

2. Description of Related Art

Multilayered films are used in many industries to package all types of consumer goods, such as food, bottles, canned items, cleaning supplies, compact discs, and many more items. Numerous attempts have been made to manufacture packaging films that provide sufficient clarity and strength to allow consumers to clearly see the product through the packaging and also protect the product from the atmosphere or protect the atmosphere from the product.

Films can be used to wrap products directly or can be used to form bags that contain consumer products. Previous attempts have been made to use films that can be used to package consumer products that need transparent packaging, such as produce. Some of these films have been manufactured with an outer heat-resistant layer of elastomer, such as a styrene-butadiene copolymer, with an outer sealant layer of a metallocene-catalyzed ethylene/alpha-olefin copolymer. Films with these types of materials have generally been found to curl, making them very difficult to process through traditional film manufacturing machinery.

Another example film with an elastomer on an outer layer with polyolefins disposed on a second and third layer can be found in U.S. Pat. No. 5,523,136 by Fischer et al. titled "Packaging Film, Packages, and Methods of Using Them" (hereinafter "Fischer '136 Patent"). The Fischer '136 Patent describes a multilayer film with an elastomer on a first outermost layer with an ethylene layer as the central layer and as another outermost layer. Because the films described in the Fischer '136 Patent are not symmetrical in structure, the films also tend to curl, which makes them very difficult to machine.

To combat problems with curling, more structurally symmetrical films have been developed. An example of such a structurally symmetrical film can be found in U.S. Pat. No. 6,294,210 by Kuo titled "Oxygen Permeable Multilayer Film" (hereinafter "Kuo '210 Patent"). The Kuo '210 Patent describes a film that has a first layer of a homogeneous ethylene/α-olefin copolymer, a second layer of a polyolefin, and a third layer of the homogeneous ethylene/α-olefin copolymer that can be used to package produce and the like. Additional layers can be added as well. Because a thicker film must be used in some applications to provide the needed film strength, films made primarily of polyolefin tend to be hazy when they are produced with thicker film gauges.

To attempt to make stronger films, others have attempted to make packaging films with varying chemical compounds that are known for providing strength. An example packaging film that uses a chemical compound that is known to increase strength can be found in U.S. Pat. No. 6,060,136 by Patrick et al. titled "High Modulus Oxygen-Permeable Multilayer Film" (hereinafter "Patrick '136 Patent"). The Patrick '136 Patent describes a structurally sysmetrical multilayer film including a first layer of a homogeneous ethylene/alpha-olefin copolymer, a second layer of a thermoplastic elastomer, and a third layer of the homogeneous ethylene/alpha-olefin copolymer. Additional layers can be added. Thermoplastic elastomers are known to increase strength in films. The film of the Patrick '136 Patent is used for packaging food and requires a high oxygen transmission rate to ensure that the produce contained within the film receives enough oxygen to remain fresh. The core layer of the thermoplastic elastomer of a multilayer film is generally the center layer of the film, which is also generally the thickest layer. Because the thermoplastic elastomer material used in the center layer is relatively expensive, the cost of producing a film in accordance with the Patrick '136 Patent can be expensive. Films made with thermoplastic elastomers also lack optical properties that may be important in other applications.

A need exists for a packaging film that is economical to produce, and that can be manufactured on existing equipment without having to modify the equipment and, for example, without the need to use expensive crosslinking processes. There also is a continued need for a packaging film that is relatively thin, has good optical properties to allow a product to be seen easily through the packaging film, and has good mechanical properties to allow the packaging film to withstand outward forces being applied to the packaging without puncturing easily.

SUMMARY OF THE INVENTION

In view of the foregoing, embodiments of the present invention advantageously provide a packaging film that is relatively thin and has enhanced optical and mechanical properties. The enhanced optical and mechanical properties allow a product when substantially surrounded by the film to be seen clearly through the packaging film and also allow the packaging film to resist from being punctured easily when an outside force is applied to the packaging film. Embodiments of the present invention also advantageously provide a packaging film that is relatively inexpensive to produce and can be produced using known film manufacturing equipment.

More specifically, an embodiment of the present invention provides a combination product and shrink wrap packaging film that preferably includes a product that is substantially surrounded by the packaging film. The packaging film preferably contacts and substantially surrounds the product so that when the packaging film is heated to shrink the packaging film around the product, the packaging film encases the product so that the product is securely restrained by the packaging film. This type of film is commonly referred to as shrink-wrap film. The packaging film preferably includes a first outermost layer of elastomer, a second layer of polyolefin, and a third outermost layer of elastomer. The second layer of polyolefin preferably overlies and abuttingly contacts the first outermost layer of elastomer. The third outermost layer of elastomer preferably overlies and abuttingly contacts the second layer of the polyolefin so that the second layer of polyolefin is preferably positioned between the first and the third outermost layers of elastomer. The packaging film advantageously has enhanced optical and mechanical properties for a selected overall packaging film gauge thickness that allow the product to be seen more clearly through the packaging film and that increase modulus for the packaging film so that the packaging film is readily usable with packaging machinery, i.e., machinable, at relatively high speeds and provides packaging film having preselected optical and mechanical properties related to appearance, strength, and shrink. Conventional packaging machinery can be used, as understood by those of ordinary skill in the art.

Embodiments of the present invention also advantageously provide a packaging film that has enhanced optical and mechanical properties. The packaging film preferably includes a first layer of a sheet of elastomer, a second layer of polyolefin, and a third layer of a sheet of elastomer. The second layer of polyolefin preferably has a first surface that abuttingly contacts a first surface of the first layer of the sheet of elastomer. The third layer of the sheet of elastomer preferably abuttingly contacts a second surface of the second layer of polyolefin. The second layer of polyolefin is preferably positioned between the first and third layers of the sheets of elastomer.

The packaging film advantageously has enhanced optical properties and enhanced mechanical properties for a selected overall packaging film gauge thickness so that a product surrounded by the packaging film can be seen more clearly through the packaging film without the necessity of removing the packaging film and the packaging film is not easily punctured when an outside force is applied thereto. The packaging film of the present invention is advantageously capable of being readily usable with packaging machinery, i.e., machinable, at relatively high speeds and provides packaging film having preselected optical and mechanical properties related to appearance, strength, and shrink properties. For example, the packaging film of the present invention can have a 45° gloss in a range of about 70% to about 110%.

Methods of forming the packaging film with enhanced optical and mechanical properties are also advantageously provided. In one embodiment, the method of forming a packaging film having enhanced optical and mechanical properties advantageously includes positioning a first extruded layer of elastomer, a second layer of polyolefin and a third extruded layer of elastomer so that the first and third extruded layers of elastomer are the outermost layers of the packaging film. The packaging film can be produced by a blown film process, as understood by those of ordinary skill in the art of packaging films. As a step of the blown film process, the layered laminar structure is stretched and air is supplied to the layered laminar structure to produce a bubble. The bubble is then collapsed, typically by rollers, to form the packaging film. The packaging film preferably has a second layer of polyolefin positioned between and abuttingly in contact with first and third outermost layers of elastomer. The packaging film advantageously has enhanced optical and mechanical properties for a selected overall packaging film gauge thickness that allow a product surrounded by the packaging film to be seen more clearly through the packaging film and that increase modulus for the packaging film so that the packaging is readily usable with packaging machinery, i.e., machinable, at relatively high speeds and provides packaging film having preselected optical and mechanical properties for the packaging film related to appearance, strength, and shrink properties.

Another embodiment of a method of forming a packaging film having enhanced optical and mechanical properties so that a product surrounded by the packaging film can be seen more clearly through the packaging film and the packaging film is not punctured easily when an outside force is applied thereto. In this embodiment, the method preferably includes the step of positioning a first extruded layer of elastomer, a second extruded layer of polyolefin, and a third extruded layer of elastomer to form the packaging film. The packaging film is preferably formed by using a cast film process, as understood by those of ordinary skill in the art of packaging film production. As a step of the cast film process, the layered structure of the layers of extruded materials is rolled to form a packaging film. In the packaging film, the second layer of polyolefin is preferably positioned between and abuttingly contacts the first and the third layers of elastomer. The packaging film advantageously has enhanced optical and mechanical properties for a selected overall packaging film gauge thickness.

The enhanced optical and mechanical properties advantageously allow a product surrounded by the packaging film to be seen more clearly through the packaging film. The enhanced properties also increase modulus in the packaging film so that the packaging film is readily usable with packaging machinery, i.e., machinable, at relatively high speeds and provides packaging film having preselected optical and mechanical properties related to appearance, strength, and shrink properties.

The packaging film of the present invention has very low haze and high gloss properties that allow indicia on a product to be seen easily through the packaging film without having to remove the packaging film from the product. The packaging film also has high gloss values that make the combination product and film packaging more aesthetically appealing to consumers.

BRIEF DESCRIPTION OF THE DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope since it may include other effective embodiments as well.

FIG. 1 is a perspective view of a roll of a packaging film in accordance with an embodiment of the present invention;

FIG. 2 is a fragmentary sectional view of the packaging film of FIG. 1 taken along the line 2-2 in accordance with an embodiment of the present invention;

FIG. 5A is a bar graph illustrating the percentage of haze for a plurality of tested film samples that were each formed in accordance with an embodiment of the present invention;

FIG. 5B is a graph illustrating the percentage of haze for a plurality of tested film samples that were formed in accordance with an embodiment of the present invention grouped according to the percentage of elastomer contained in a first outer layer of the packaging film;

FIG. 9A is a graph illustrating the tensile at yield in a machine direction measured in psi for each sample that was tested in accordance with an embodiment of the present invention;

FIG. 9B is a graph illustrating the tensile at yield in a machine direction measured in psi for each sample that was tested in accordance with an embodiment of the present invention grouped according to the percentage of elastomer contained in a first outer layer of the packaging film;

FIG. 11A is a graph illustrating the tear test results in a machine direction measured in psi for a plurality of tested film samples that were each formed in accordance with an embodiment of the present invention;

FIG. 11B is a graph illustrating the tear test results in a machine direction measured in psi for a plurality of tested film samples that were each formed in accordance with an embodiment of the present invention grouped according to the percentage of elastomer contained in a first outer layer of the packaging film;

FIG. 15 is perspective view of an example of a cast film apparatus and process used to manufacture a packaging film in accordance with an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

As illustrated in FIGS. 1-3 and 4B, embodiments of the present invention advantageously provide a combination product P and packaging film 20 that has enhanced optical and mechanical properties. The enhanced optical and mechanical properties allow the product P and indicia I on the product P to be seen clearly through the packaging film 20 and also allow the packaging film 20 to resist from being punctured easily when an outside force is applied to the film 20. The combination preferably includes a product P and a shrink-wrap packaging film 20. The shrink-wrap packaging film 20 preferably contacts and substantially surrounds the product P and is shrunk thereon. As shown in FIG. 2, the shrink-wrap packaging film 20 preferably includes a first outermost layer of elastomer 21, a second inner layer of polyolefin 23, and a third outermost layer of elastomer 25. The second inner layer of polyolefin 23 preferably overlies and abuttingly contacts the first outermost layer of elastomer 21. Third outermost layer of elastomer 25 preferably overlies and abuttingly contacts the second inner layer of the polyolefin 23. Second inner layer of polyolefin 23 is preferably positioned between the first and the third outermost layers of elastomer 21, 25.

In embodiments of the present invention, the shrink-wrap packaging film 20 advantageously provides enhanced optical and mechanical properties for a selected overall packaging film gauge thickness. The enhanced optical and mechanical properties allow the product P to be seen more clearly through the packaging film 20 and increase modulus for the packaging film 20 that allow the packaging film 20 to be readily usable through packaging machinery, i.e., machinable, at relatively high speeds and provides packaging film having preselected optical and mechanical properties related to appearance, strength, and shrink properties. Conventional packaging machinery can be used, as understood by those of ordinary skill in the art of packaging film manufacturing.

In all embodiments of the present invention, the packaging film 20 is sufficiently durable to be useful as a packaging film 20. The packaging film 20 can withstand forces being applied thereto, such as puncture sources, chime cuts, i.e. from products rubbing together, users lifting the combination product P and packaging film 20 by the packaging film 20, and the like.

Figures 4A, 4B:
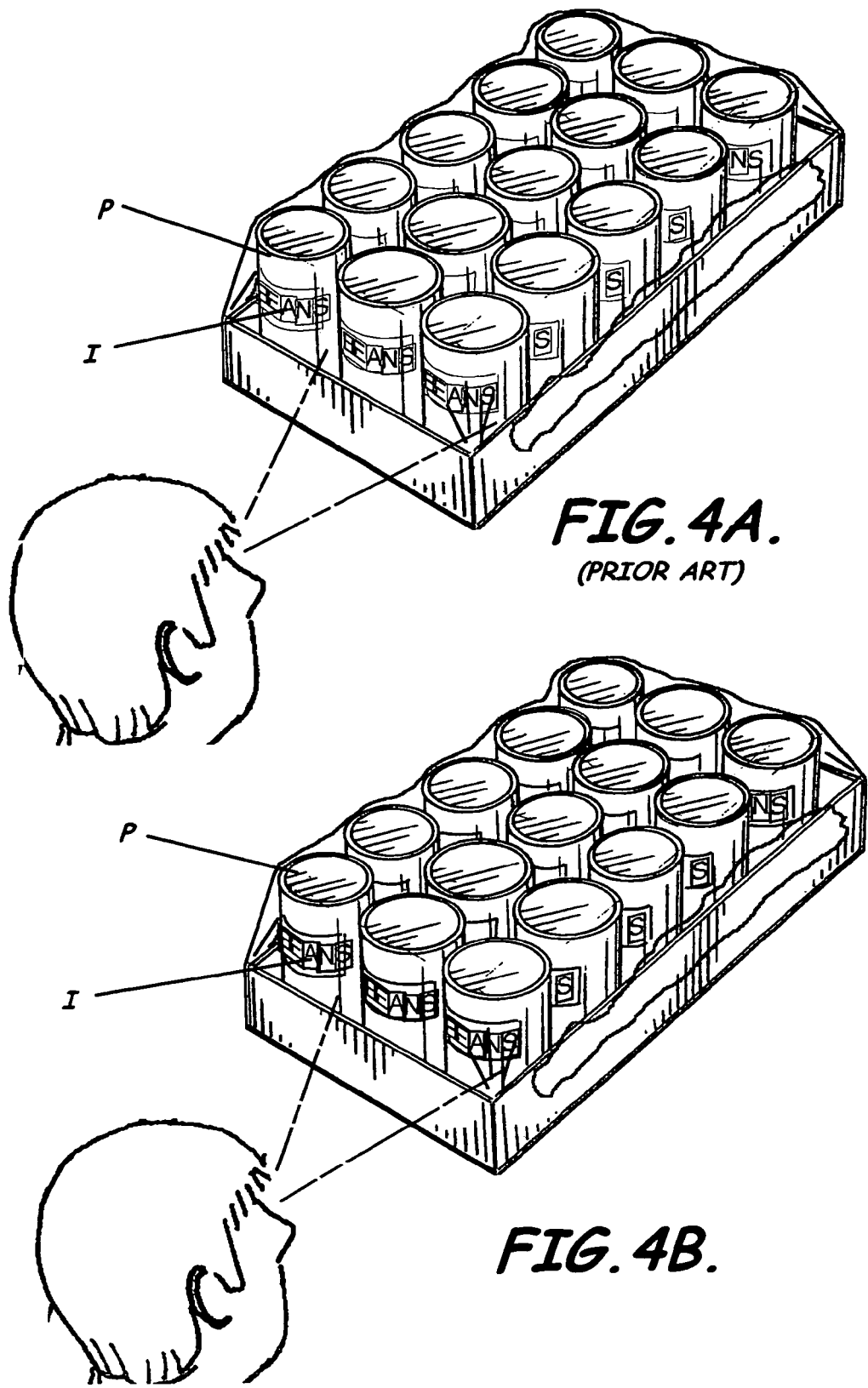
FIG. 4A is a perspective of a combination product and packaging film with the packaging film substantially surrounding the product so that the product is securely restrained by the packaging film in accordance with prior art packaging films.
FIG. 4B is a perspective of a combination product and packaging film with the packaging film substantially surrounding the product so that the product is securely restrained by the packaging film, the packaging film having enhanced optical properties so that the product can be seen more clearly through the packaging film, in accordance with an embodiment of the present invention.

FIG. 4A illustrates a prior art packaging film with a product having shrink-wrap packaging film shrunk thereon. With the prior art film, the indicia I on the product P cannot be seen as easily through the film. In the present invention, the indicia I on the product P can be seen clearly through the packaging film 20, as shown in FIG. 4B, due to the enhanced optical properties of the present invention at a comparable film gauge thickness.

In all embodiments of the present invention, the elastomer can include a styrene butadiene copolymer. Suitable butadiene styrene copolymers for use in the present invention include those commercially identified as the K-Resin® Series from Chevron Phillips Chemical Company LP of 10001 Six Pines Drive, The Woodlands, Tex. 77380. The butadiene styrene copolymer known commercially as DK11 in the K-Resin® Series performed exceptionally well in initial tests. Another exemplary example butadiene styrene copolymer is known commercially as DK13, also in the K-Resin® Series. Other suitable elastomers can include polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, methyl methacrylate alkyl acrylate butadiene styrene copolymer, and the like. Elastomers having good optical characteristics, such as high clarity, are preferred. Other suitable elastomer materials will be known to those of ordinary skill in the art and are to be considered within the scope of the present invention.

In all embodiments of the present invention, the polyolefin can include such polyolefins as, for example, non-linear ethylene ethyl acetate copolymers, non-linear ethylene homopolymers (low-density polyethylene), and ethylene vinyl acetate copolymers, which can have densities, for example, greater than 0.920 grams per cubic centimeter. Beneficially, the non-linear ethylene ethyl acetate copolymers, non-linear ethylene homopolymers, and ethylene vinyl acetate copolymers can offer economic advantages to the manufacturer due to relatively low raw material costs and due to their suitability for shrink bundling applications without having to use an expensive cross-linking process. Another effective polyolefin is a linear low density polyolefin. Other polyolefins can include polyethylene homopolymer, polypropylene homopolymer, ethylene/α-olefin copolymer, propylene/ethylene copolymer, or ethylene/unsaturated ester copolymer. Other suitable polyolefin materials will be known to those of ordinary skill in the art and are to be considered within the scope of the present invention.

Although other thicknesses of film can be used as understood by those skilled in the art, the overall packaging film gauge thickness of packaging film 20 according to embodiments of the present invention can be preferably in a range of about 0.5 to about 3 mil, and more preferably in a range of between 0.6 to 1.25 mils, so that the packaging film 20 is more economical to manufacture without a reduction in clarity of the packaging film 20 and to provide optimal coverage performance over cost while maintaining adequate strength for a substantial portion of the applicable uses.

In an embodiment of the film 20 of the present invention, as perhaps best shown in FIG. 2, the first layer of elastomer can be preferably in a range of about 2.5% to about 27.5%, and more preferably in a range of about 10% to about 25% of the overall shrink-wrap packaging film gauge thickness X1. The second inner layer of polyolefin can be preferably in a range of about 45% to 95%, and more preferably in a range of about 50% to about 80% of the overall shrink-wrap packaging film gauge thickness Y1. The second layer of polyolefin can include a lower cost material as compared with the material used in the first in third layer of elastomer that lowers the overall cost of manufacturing film 20. The second layer of polyolefin can be configured to be less than 45% of the overall shrink-wrap packaging film gauge thickness at a small cost and performance disadvantage. The third outermost layer of elastomer can be preferably in a range of about 2.5% to about 27.5%, and more preferably in a range of about 10% to about 25% of the overall shrink-wrap packaging film gauge thickness X2. The film 20 made in accordance with embodiments of the present invention has enhanced optical and mechanical properties that are particularly advantageous when used as a film 20 and, more specifically, as a shrink film 20. The optical and mechanical properties that are enhanced as a result of the present invention include haze, gloss, modulus, tensile strength, a measure of shrink, and a dart impact strength.

Figures 6A, 6B:
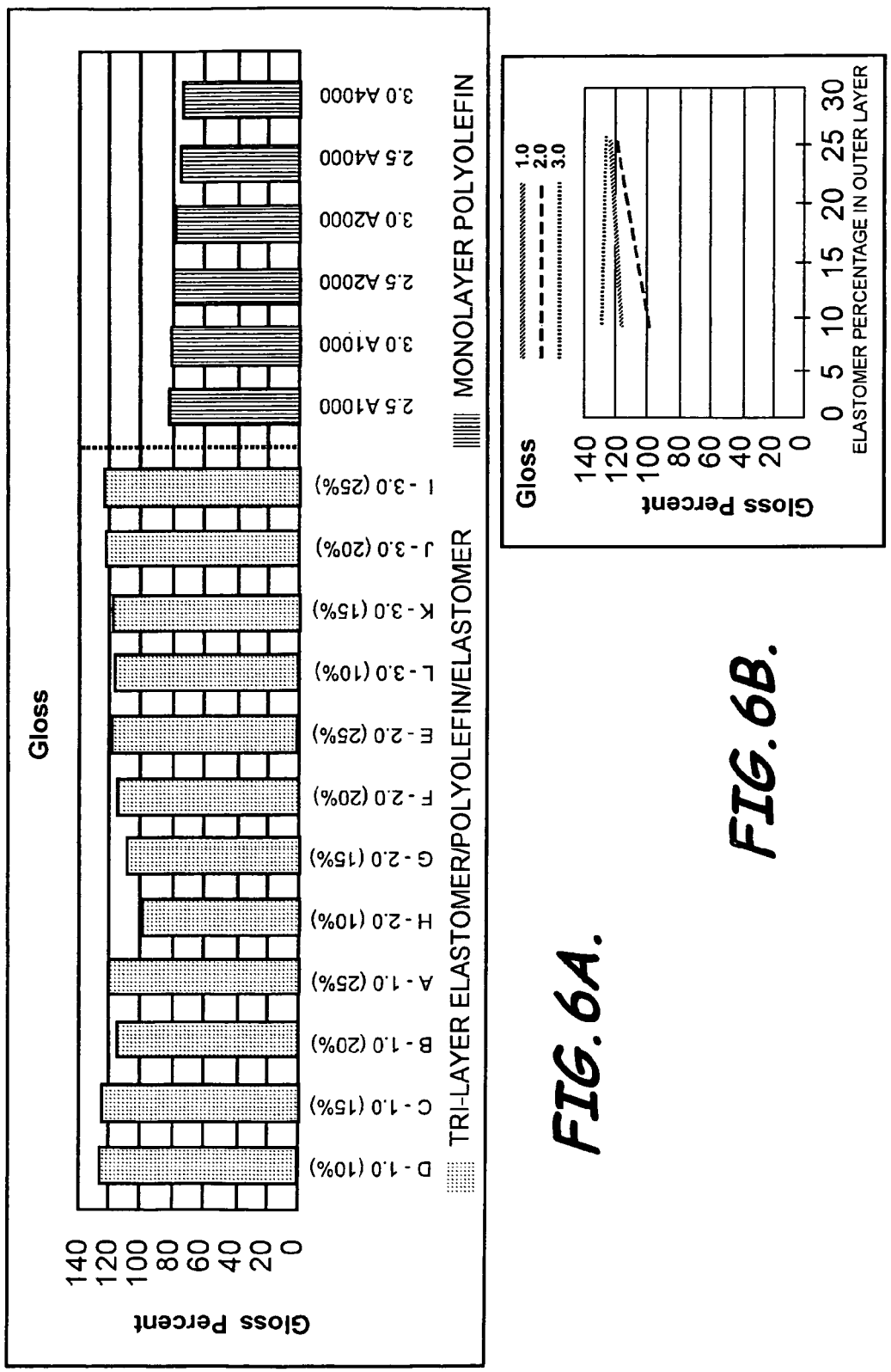
FIG. 6A is a bar graph illustrating the percentage of forty-five degree (45°) gloss for a plurality of tested film samples that were each formed in accordance with an embodiment of the present invention.
FIG. 6B is a graph illustrating the percentage of forty-five degree (45°) gloss for a plurality of tested film samples that were each formed in accordance with an embodiment of the present invention grouped according to the percentage of elastomer contained in a first outer layer of the packaging film.
Figures 7A, 7B:
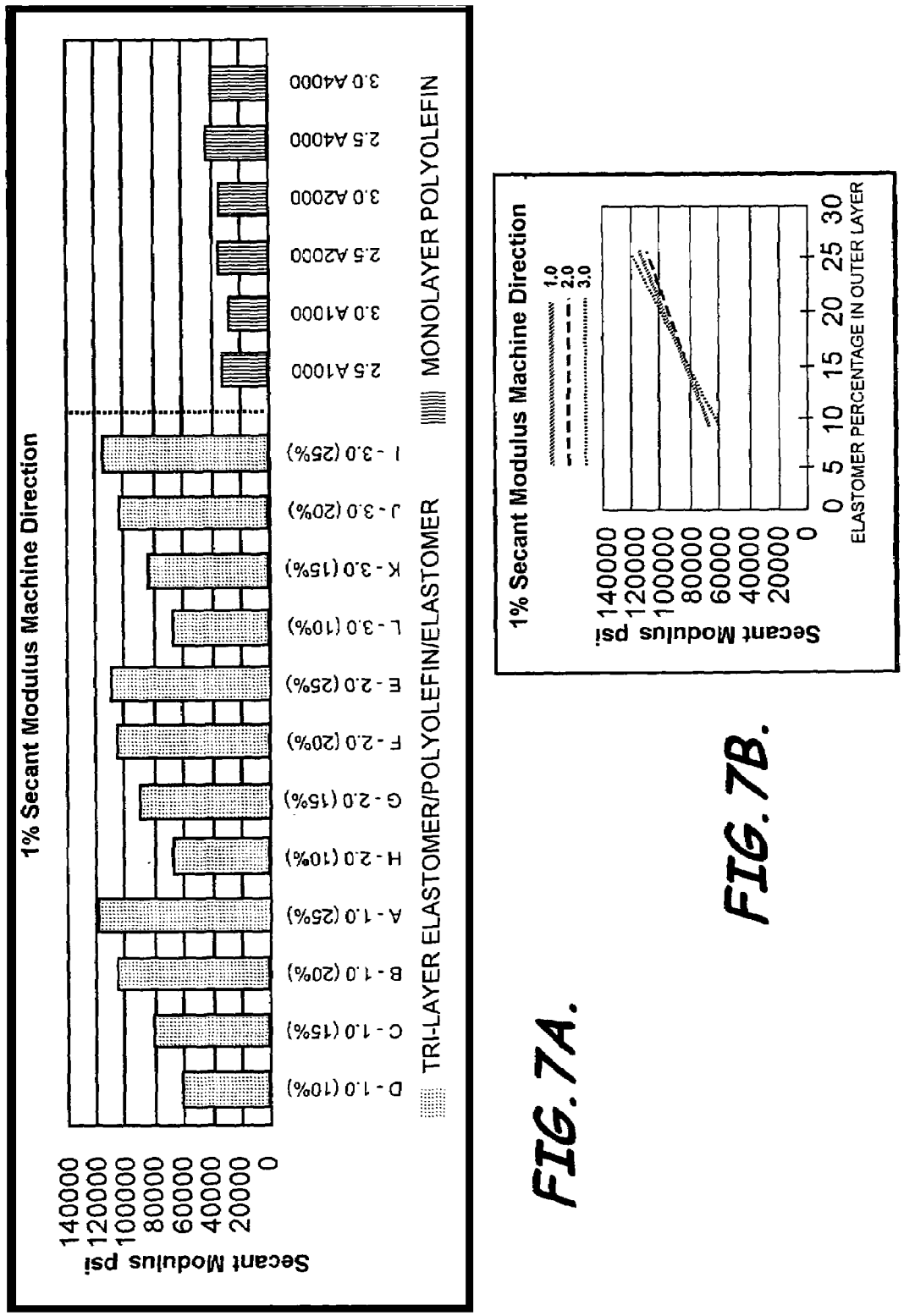
FIG. 7A is a graph illustrating the one percent (1%) secant modulus in a machine direction measured in pounds per square inch ("psi") for a plurality of tested film samples that were each formed in accordance with an embodiment of the present invention.
FIG. 7B is a graph illustrating the one percent (1%) secant modulus in a machine direction measured in pounds per square inch ("psi") for of a plurality of tested film samples that were each formed in accordance with an embodiment of the present invention grouped according to the percentage of elastomer contained in a first outer layer of the packaging film.
Figures 8A, 8B:
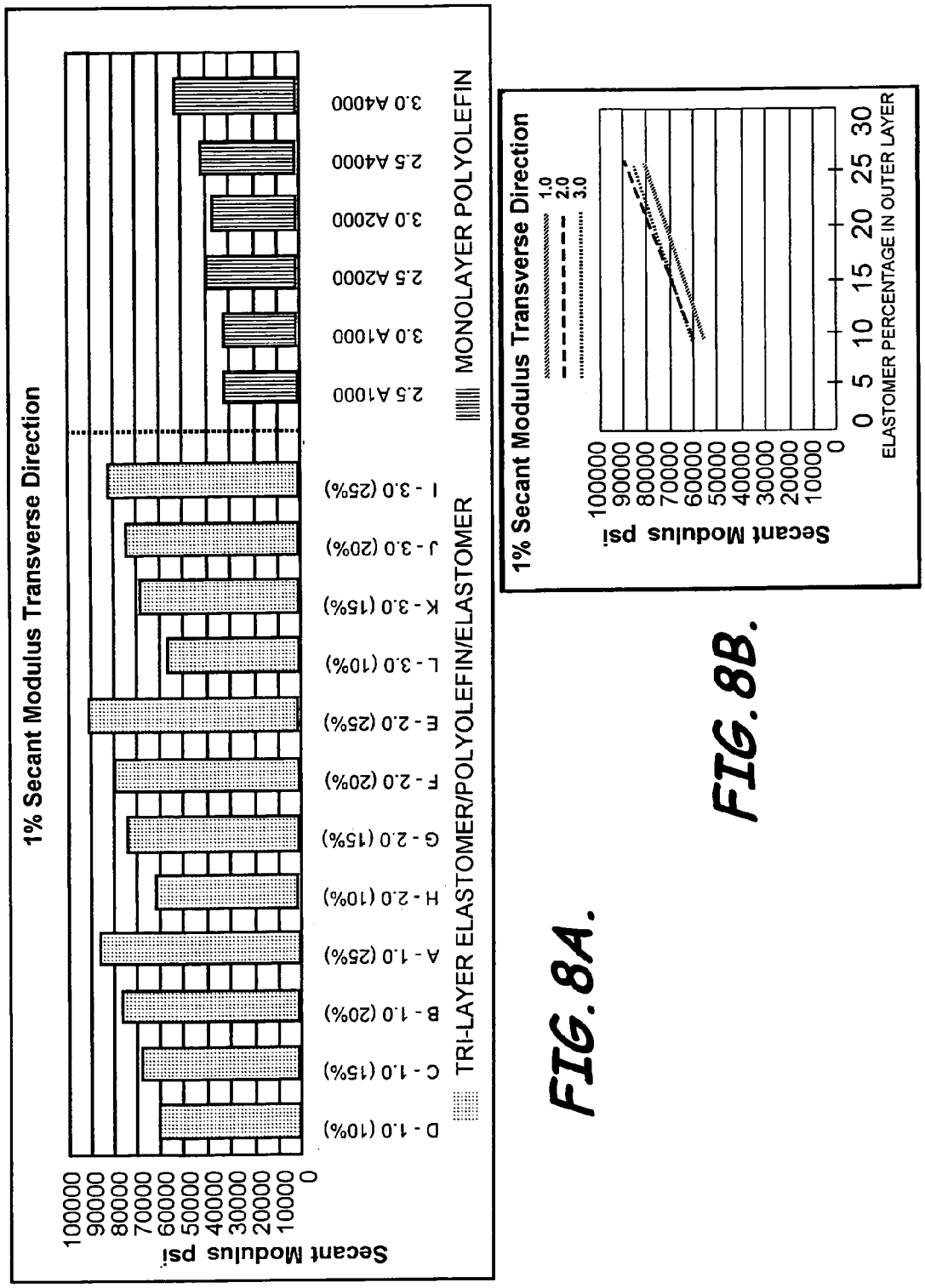
FIG. 8A is a graph illustrating the one percent (1%) secant modulus in a transverse direction measured in psi for a plurality of tested film samples that were each formed in accordance with an embodiment of the present invention.
FIG. 8B is a graph illustrating the one percent (1%) secant modulus in a transverse direction measured in psi for a plurality of tested film samples that were each formed in accordance with an embodiment of the present invention grouped according to the percentage of elastomer contained in a first outer layer of the packaging film.
Figures 10A, 10B:
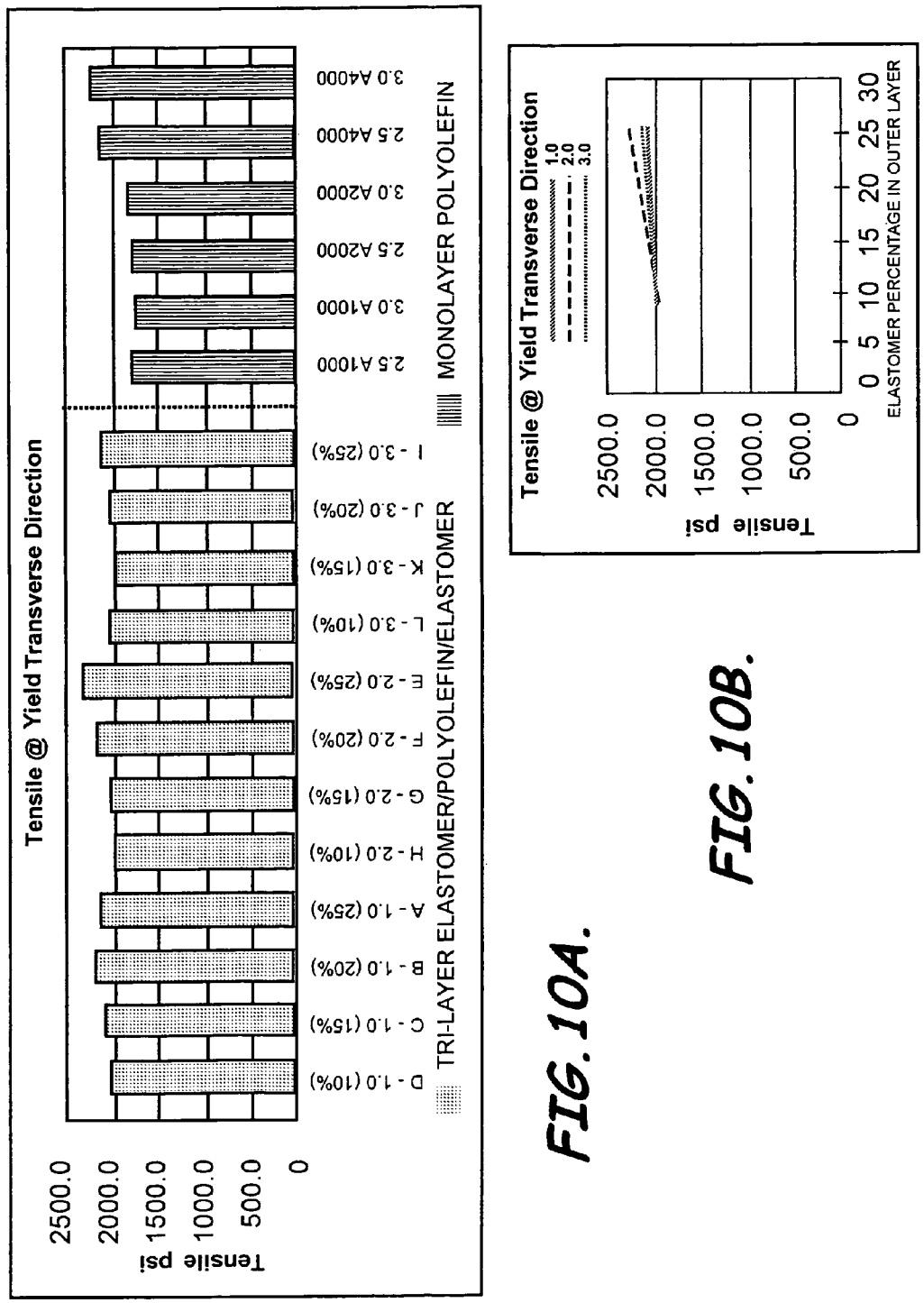
FIG. 10A is a graph illustrating the tensile at yield test results in a transverse direction measured in psi for a plurality of tested film samples that were each formed in accordance with an embodiment of the present invention.
FIG. 10B is a graph illustrating the tensile at yield test results in a transverse direction measured in psi for a plurality of tested film samples that were each formed in accordance with an embodiment of the present invention grouped according to the percentage of elastomer contained in a first outer layer of the packaging film.
Figures 12A, 12B:
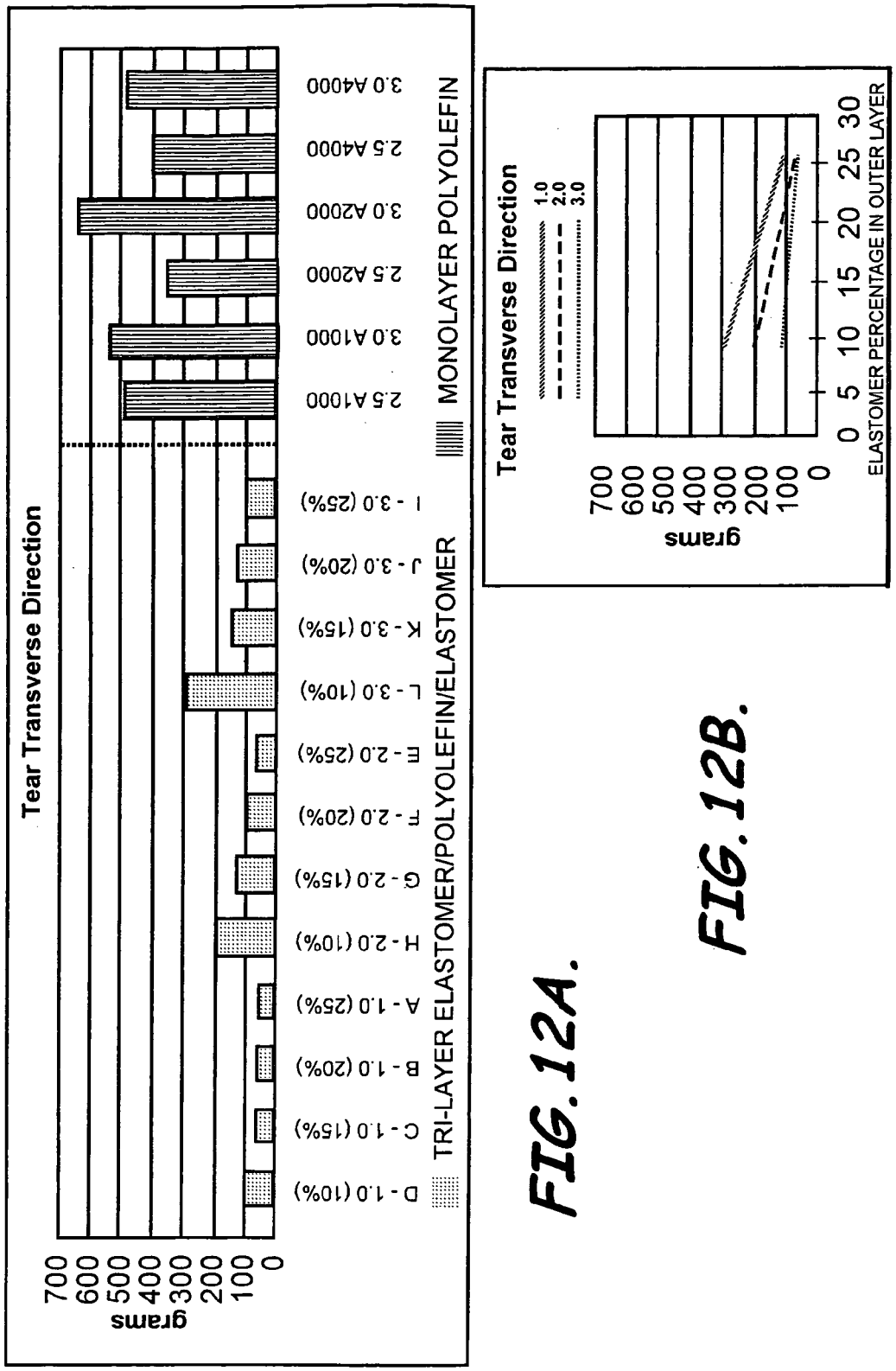
FIG. 12A is a graph illustrating the tear test results in a transverse direction measured in psi for a plurality of tested film samples that were each tested in accordance with an embodiment of the present invention.
FIG. 12B is a graph illustrating the tear test results in a transverse direction measured in psi for a plurality of tested film samples that were each tested in accordance with an embodiment of the present invention grouped according to the percentage of elastomer contained in a first outer layer of the packaging film.

In embodiments of the film 20 of the present invention, the film 20 preferably has a haze, which is one of the enhanced optical properties, in a range of about 1% to about 10%, as shown in FIGS. 5A and 5B. The lower the haze, the better for a packaging film 20. Haze is a measurement of the cloudiness of the film 20. A haze value in a range of about 1% to about 10% indicates that the packaging film 20 is clear and the product P, which is substantially surrounded by the packaging film 20 when shrunk thereon, optionally having indicia I thereon can be seen easily through the packaging film 20. As shown in FIGS. 6A and 6B, the enhanced optical properties can also include a 45° gloss in a range of about 70% to about 110%, and more preferably in a range of about 70% to about 110%, so that the packaging film 20 is shiny and the product P can be seen easily through packaging film 20 once the packaging film 20 is heated to securely restrain the product P within packaging film 20. Gloss is important for packaging film 20 since the packaging has a more appealing look and presence when displayed upon a shelf. Packaging with shiny surfaces is generally more desirable to consumers than packaging having dull surfaces.

In all embodiments of the present invention, packaging film 20 can include indicia I on the packaging film 20. The indicia I can make the combination product P and shrink-wrap packaging film 20 more aesthetically pleasing to consumers.

As shown in FIGS. 9A, 9B, 10A, and 10B, enhanced mechanical properties of the film 20 can include a tensile strength in a range of about 2000 psi to about 3500 psi so that the packaging film 20 is not easily punctured once shrunk onto a product P to securely restrain the product P within the packaging film 20. As illustrated in FIGS. 7A, 7B, 8A, and 8B, the enhanced mechanical properties also can include a tensile modulus in a range of about 50,000 psi to about 120,000 psi so that the packaging film 20 is sufficiently durable once heated to securely restrain the product P within the packaging film 20. The increased tensile modulus advantageously enables packaging film 20 to be processed through packaging machinery at relatively high speeds. The enhanced mechanical properties further can include a measurement of shrink in a transverse direction in a range of about 0% to about 70%, preferably about 10% to about 65%, and still more preferably about 25% to about 65% in "total enclosure" shrink wrap packaging applications; preferably about 1% to about 25%, and still more preferably about 1% to about 15% in "bulls eye" shrink wrap packaging applications; and in a machine direction in a range of about 60% to about 90% so that the packaging film 20 shrinks sufficiently to securely restrain the product P within the packaging film 20. Films having high transverse direction shrink perform exceptionally well in "total enclosure" shrink wrap packaging applications, as understood by those of ordinary skill in the art of shrink wrapped films. Films having low transverse direction shrink perform exceptionally well in "bulls eye" shrink-wrap packaging applications, as understood by those of ordinary skill in the art of shrink wrap films.

Figures 13A, 13B:
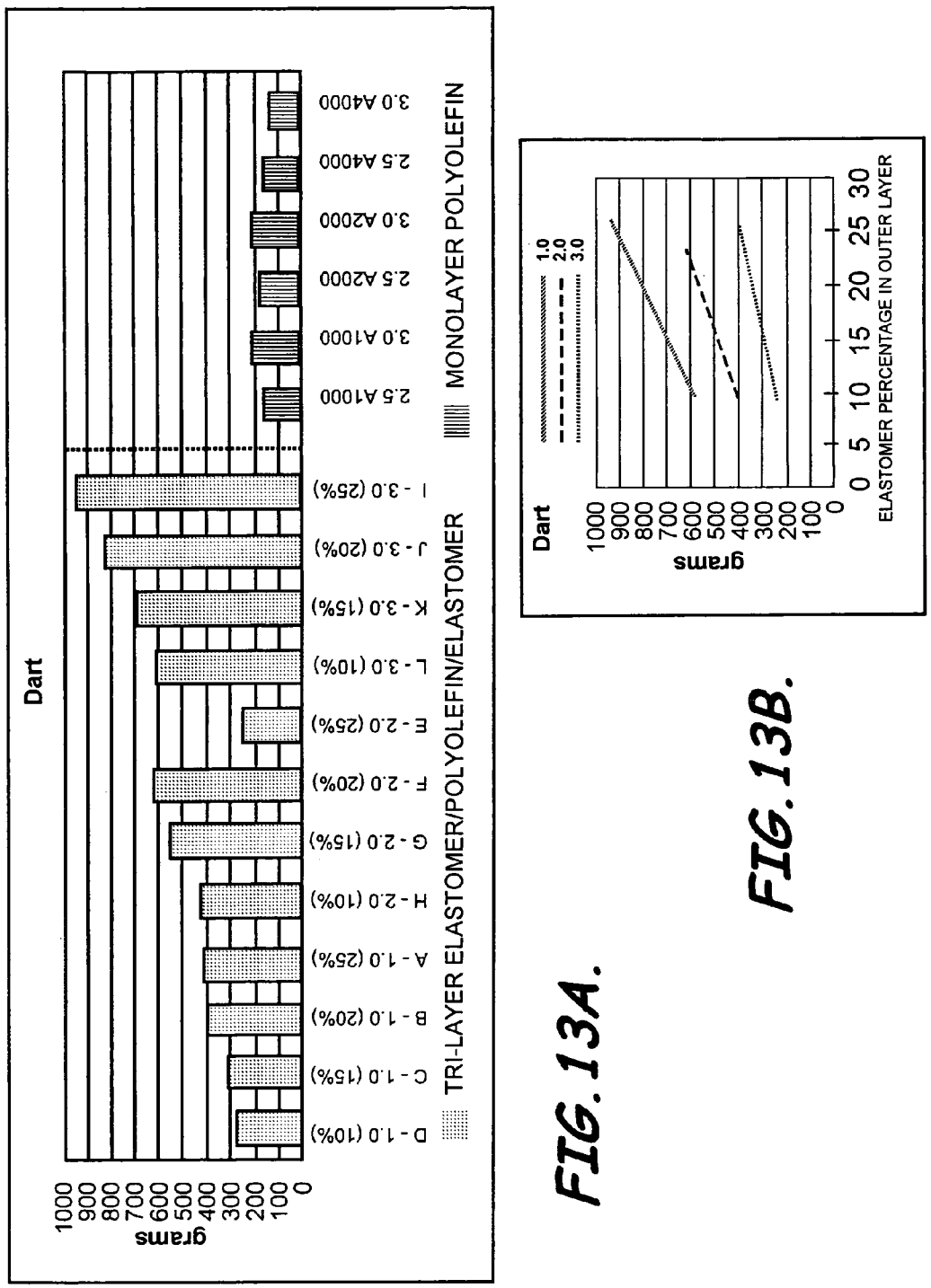
FIG. 13A is a graph illustrating the dart impact test results measured in grams for a plurality of tested film samples that were each formed in accordance with an embodiment of the present invention.
FIG. 13B is a graph illustrating the dart impact test results measured in grams for a plurality of tested film samples that were each formed in accordance with an embodiment of the present invention grouped according to the percentage of elastomer contained in a first outer layer of the packaging film.

Another mechanical property that is measured for embodiments of packaging films 20 of the present invention is the dart impact strength. The dart impact strength in all embodiments of the present invention is preferably in a range of about 300 grams to about 1000 grams so that the packaging film 20 will not puncture easily when an outside force is applied thereto, as shown in FIGS. 13A and 13B. A dart impact test, which has been standardized in ASTM D 3763, for example, measures the amount of energy necessary for a high-speed, round-tipped dart to puncture a 3.2 mm thick film 20. This test is an important indicator of impact strength for films 20.

An embodiment of the present invention also advantageously provides a packaging film 20 having enhanced optical and mechanical properties. The enhanced optical and mechanical properties enable a product P surrounded by packaging film 20 to be seen more clearly through packaging film 20, without the need to remove packaging film 20. The enhanced properties also prevent the packaging film 20 from being punctured easily when an outside force is applied thereto. Packaging film 20 preferably includes a first layer of a sheet of elastomer 21, a second layer of polyolefin 23, and a third layer of a sheet of elastomer 25. The second sheet of polyolefin 23 advantageously has a first surface abuttingly contacting a first surface of the first layer of the sheet of elastomer 21. The third layer of the sheet of elastomer 25 abuttingly contacts a second surface of the second layer of polyolefin 23 so that the second layer of polyolefin 23 is preferably positioned between the first and third layers of elastomer 21, 25. Packaging film 20 preferably has a 45° gloss in a range of about 70% to about 110%.

Several methods of forming the packaging film 20 with enhanced optical and mechanical properties also are provided according to the present invention. The packaging film 20 of the present invention can be manufactured using typical bubble blown film processes and machines 30 and cast film processes and machines 30' without having to modify the machine or equipment, as can be seen in FIGS. 14 and 15.

Figure 14:
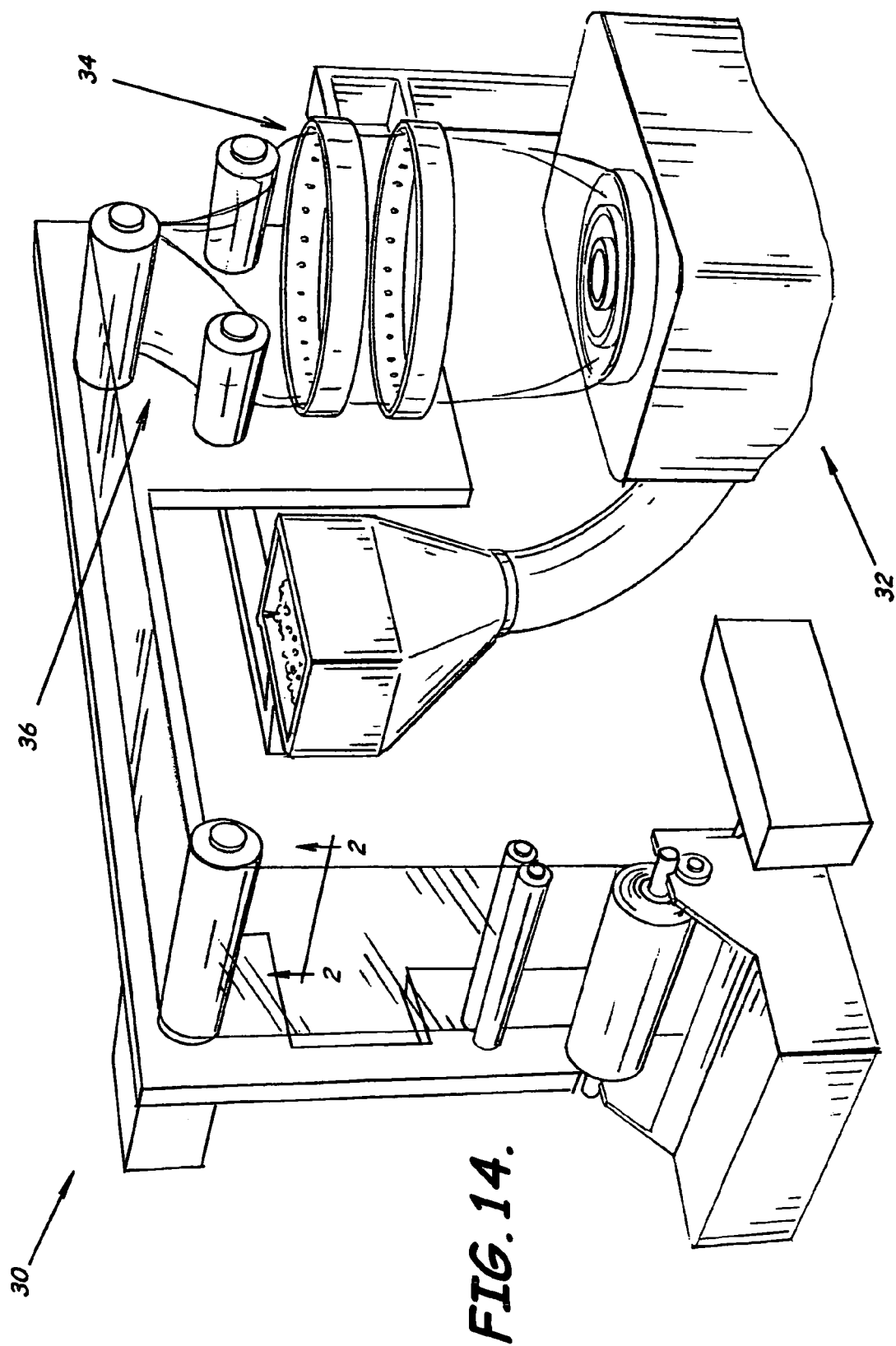
FIG. 14 is a perspective view of an example of a blown film apparatus and process used to manufacture a packaging film in accordance with an embodiment of the present invention.

In one embodiment illustrated in FIG. 14, the method of forming a packaging film 20 having enhanced optical and mechanical properties advantageously includes positioning a first extruded layer of elastomer 21, a second extruded layer of polyolefin 23, and a third extruded layer of elastomer 25 so that the first and third extruded layers of elastomer 21, 25 are the outermost layers of packaging film 20. The extruder 32 used to form the layers for use in packaging film 20 can be a series of individual extruders 32 for each material to form a separate layer having its own extruder 32. Alternatively, a coextruder 32 that can extrude two or more materials through a single die with two or more orifices arranged so that the extruded materials merge into a laminar structure can also be used. The elastomer and polyolefin materials are melted in the extruder 32 to produce a molten material, each of which is then forced through a die to produce a layered laminar structure. The layered laminar structure is then formed into packaging film 20 by conventional blown film processes, as understood by those of ordinary skill in the art of packaging film manufacturing. For example, the layered laminar structure can be stretched and exposed to air that is supplied to the layered laminar structure to produce a bubble 34. The bubble 34 is then collapsed, typically by rollers 36, to form a packaging film 20, as understood by those of ordinary skill in the art. The packaging film 20 preferably has an inner second layer of polyolefin 23 positioned between first and third outermost layers of elastomer 21, 25. The packaging film 20 advantageously has enhanced optical and mechanical properties for a selected overall packaging film gauge thickness that allow a product P surrounded by packaging film 20 to be seen more clearly through packaging film 20 without having to remove packaging film 20. The enhanced optical and mechanical properties also increase modulus for packaging film 20 so that packaging film 20 is readily usable with packaging machinery, i.e., machinable, at relatively high speeds. The elastomer is preferably a styrene butadiene copolymer or any other suitable elastomer, as described herein, and the polyolefin is selected from the group consisting of polyethylene and polypropylene or any other suitable polyolefin, as described herein, such as non-linear ethylene ethyl acetate copolymers, non-linear ethylene homopolymers, and non-linear ethylene vinyl acetate copolymers.

It is understood that in the blown film manufacturing process, as shown in FIG. 14, the step of collapsing the bubble 34 can be performed in various manners. Bubble 34 can be collapsed quickly, which allows the inner layers of the bubble 34 to fuse together, effectually making a flat sheet. If this technique is used with the packaging film 20 of the present invention, then a five layer packaging film 20 would be manufactured with the structure being a layer of elastomer/a layer of polyolefin/a layer of elastomer/a layer of polyolefin/a layer of elastomer. Alternatively, the bubble 34 could be sufficiently quenched into a solid form prior to collapsing the bubble. If this method is used, essentially a flattened tube in formed in which the inside surfaces of the flattened tube will not adhere to one another. Both of the methods of collapsing the bubble 34 in the blown film processes are considered within the scope of the present invention, along with the resulting five layer packaging film embodiments and the flattened tube material.

If a flattened tube material is formed, the flattened tube material can then be converted to a roll stock of packaging film for sale to consumers, as shown in FIG. 1, by three methods. The first method is to roll up the flattened tube material on a winder resulting in a tubular roll that can then be sold. This method is typically used for some form-fill-seal machines that form bags by placing a horizontal seal on the tube to form a bottom of the bag, filling the tube with product P, and then placing another horizontal seal across the top of the tube to form a top of the bag that is sealed. The second method of converting the flattened tube material to a roll stock is to cut the flattened tube material with a single slitting blade at one location on the web, which makes what is known as V sheeting. V sheeting can be used by end users to insert products, such as compact discs, between the sheets and heat seal both ends and the side of the sheets that has been cut open. The third method of converting the flattened tube material to a roll stock is to cut the flattened tube material with slitting blades at both ends, and optionally between the ends, to form what is known as sheeting, or single wound rolls. Packaging film sheeting is then formed by the end users on their own machinery to enclose the product within the packaging film sheeting. The methods for converting the flattened tube material to roll stock are also considered within the scope of the present invention.

Figure 3:
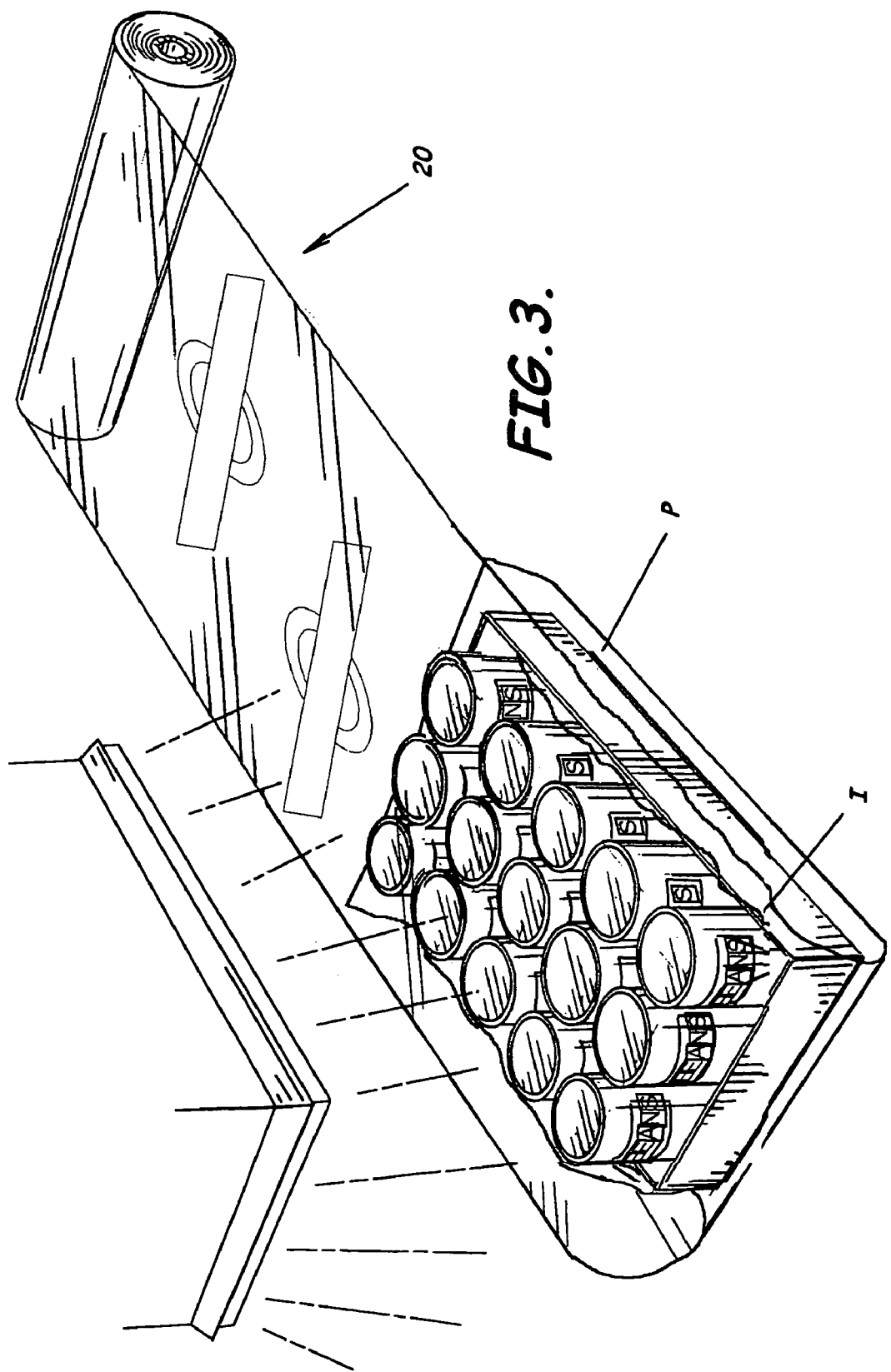
FIG. 3 is a perspective view of a packaging film being placed to substantially surround a product in accordance with an embodiment of the present invention.

The overall packaging film gauge thickness preferably is in a range of about 0.5 to about 3 mil, and more preferably in a range of between 0.6 to 1.25 mils, and the method can further include the step of printing indicia I on the packaging film 20 after the packaging film 20 has been formed, as shown in FIG. 3. As understood by those skilled in the art, when indicia I is printed on the packaging film 20 of the present invention, the indicia I is reverse printed on a surface of the packaging film 20 that contacts the product P so that the indicia I can be seen clearly through the packaging film 20. The indicia I can be located on a surface of the packaging film 20 that contacts the product P when the packaging film 20 is shrunk thereon. The packaging film 20 functions as a physical protective coating for the indicia I. Chemical coatings that are typically used in printing processes to protect the indicia I are not required.

Another embodiment of a method of forming a packaging film 20 having enhanced optical and mechanical properties 30' so that for a selected overall packaging film gauge thickness, as shown in FIG. 15. In this embodiment, the method preferably includes the step of positioning a first extruded layer of elastomer 21, a second extruded layer of polyolefin 23, and a third extruded layer of elastomer 25 to form packaging film 20. To produce the extruded layers, in the extruder 32', the elastomer and polyolefin are melted to produce a molten material, which is then forced through a die to produce a layered laminar structure. As previously indicated, a coextruder with a single die with two or more orifices can also be used. The layered laminar structure is then formed into packaging film 20 by conventional cast film processes, as shown in FIG. 15 and as understood by those of ordinary skill in the art of packaging film manufacturing. For example, the extruded layers can be rolled with rollers 36' to form a packaging film 20, as shown in FIG. 15. In the layered laminar structure of the packaging film 20, the second layer preferably is polyolefin 23 positioned between first and third layers of elastomer 21, 25. The packaging film 20 advantageously has enhanced optical and mechanical properties for a selected overall packaging film gauge thickness. For example, a thinner film 20 can be produced that still enables users to clearly see the product P through the packaging film 20 and that resists puncturing when an outside force is applied thereto.

The elastomer provided is preferably a styrene butadiene copolymer and the polyolefin is preferably selected from the group consisting of non-linear ethylene ethyl acetate copolymers, non-linear ethylene homopolymers, ethylene vinyl acetate copolymers, polyethylene, and polypropylene, as described herein. Other suitable elastomers and polyolefins are described herein and can also be used in the embodiments of forming a packaging film 20 in accordance with the present invention. The overall packaging film gauge thickness preferably is in a range of about 0.5 to about 3 mil, and more preferably in a range of between 0.6 to 1.25 mils, and the method further includes the step of printing indicia I on the packaging film 20 after the packaging film 20 has been formed, as indicated herein.

The film 20 produced in accordance with the present invention advantageously can be produced with a lower gauge, which allows manufacturers to use less material when manufacturing the film 20, thereby lowering manufacturing costs. Films 20 typically have a gauge of about 2 to about 3.5 mil thick. The film 20 of the present invention advantageously has a film gauge thickness is in a range of about 0.5 to about 3 mil, and more preferably in a range of between 0.6 to 1.25 mils. A mil is defined herein as a measurement of thickness. One mil is one thousandth of an inch. For example, a 0.80 stretch wrap is 0.8 thousandths of an inch thick. The 80 gauge is the equivalent of 0.80 mil. The 80 gauge or 0.80 mil thick stretch wrap performs well for many applications requiring packaging film 20.

To form the combination product P and film 20 embodiments of the present invention, the film 20 is first stretched out. During this stretched out orientation, the molecules with the elastomers and polyolefins are locked, or frozen, into their elongated state. A product P is then placed on the film 20 and the film 20 is then essentially wrapped around the product P. When heat is applied to the film 20 with the product P placed within the film 20, excess energy increases molecular motion within the chemical compounds that form the layers of the film 20. The elongated chemical molecules recoil, or shrink, back to their preferred random and disordered orientation. The result is a product P with the shrink-wrap packaging film 20 shrunk thereon. The film 20 securely restrains the product P within the film 20.

Tests were performed on twelve different samples of packaging film 20 manufactured in accordance with the present invention. Descriptions of the twelve samples can be found in Table 1 herein below. For the elastomer, a butadiene styrene copolymer known commercially as DK11 in the K-Resin® Series manufactured by Chevron Phillips Chemical Company was used in the test. A 3% antiblock additive was used in the elastomer layers to prevent the outer layers from sticking together once the finish packaging film 20 was made and formed into rolls. For the polyolefin, a low-density polyethylene was used. The layer percentages relate to the thickness of each layer used in the total film gauge thickness. For example, Sample A was a 1.0 mil thick packaging film 20 that was created with a 0.25 mil thick layer of butadiene styrene copolymer, a 0.50 mil thick layer of polyolefin, and a 0.25 mil thick layer of butadiene styrene copolymer. The test results are shown in the graphs shown in FIGS. 5A-13B. The sample designations listed in Table 1 correspond to the samples listed on the X-axis of the graphs in FIGS. 5A-13B.

TABLE 1

| Total Film gauge thickness | SAMPLE DESCRIPTIONS | | | |
|---|---|---|---|---|
| | Layer Percentages | | | |
| (mils) | 25/50/25 | 20/60/20 | 15/70/15 | 10/80/10 |
| 1.0 | A | B | C | D |
| 2.0 | E | F | G | H |
| 3.0 | I | J | K | L |

Depending upon the desired characteristics of the packaging film 20 in accordance with an embodiment of the present invention, the optical and mechanical properties can be customized by increasing the amount of elastomer or polyolefin within the packaging film 20. For example, mechanical properties related to strength, such as tensile at yield, modulus, and ultimate tensile are generally higher for the packaging films 20 containing a higher amount of the elastomer and lower for those containing a higher amount of polyolefin, as shown in FIGS. 7A, 7B, 8A, 8B, 9A, 9B, 10A, 10B, 13A, and 13B. Similarly, optical properties, such as haze and gloss, are generally higher for the packaging films 20 containing a higher amount of the elastomer and lower for those containing a higher amount of polyolefin, as shown in FIGS. 5A, 5B, 6A, and 6B. Conversely, tear resistance is higher for structures containing higher amounts of polyolefin and lower for structures containing higher amounts of elastomer, as shown in FIGS. 11A, 11B, 12A, and 12B. The ability to change the amount of elastomer or polyolefin allows the packaging film 20 to be manufactured or customized, to enhance specific characteristics related to the packaging film 20.

As an advantage of the present invention, the shrink-wrap or other packaging films 20 made in accordance with the present invention are more economical to manufacture. The use of the elastomer in the film improves the physical properties of the film 20, so that a thinner packaging film 20 can be made. The performance properties of the packaging film 20 remains the same or are increased with a thinner gauged film 20. Because less material is needed to manufacture the film 20 and conventional equipment can be used, manufacturing costs are lowered.

As another advantage of the present invention, the films 20 provide evidence of tampering if someone attempts to remove the film 20 that has been heat sealed to a product P. The clarity of the film 20 allows users to easily determine if tampering has occurred.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A shrink-wrap packaging film comprising:
   a first layer comprising a sheet of elastomer in a range of between about 2.5% to about 27.5% of an overall thickness of the shrink-wrap packing film;
   a second layer of polyolefin comprising at least one of non-linear ethylene ethyl acetate copolymers, non-linear ethylene vinyl acetate copolymers, non-linear ethylene homopolymers, polypropylene homopolymers and propylene/ethylene copolymers, the second layer having a first surface abuttingly contacting a first surface of the first layer that comprises the sheet of elastomer, wherein the second layer is formed without a cross-linking process and is in a range of between about 45% to about 95% of the overall thickness of the shrink-wrap packaging film; and
   a third layer comprising a sheet of elastomer abuttingly contacting a second surface of the second layer so that the second layer is positioned between the first and third layers, wherein the third layer is in a range of between about 2.5% to about 27.5% of the overall thickness of the shrink-wrap packaging film,
   wherein the shrink-wrap packaging film is configured to shrink in a transverse direction in a range of about 10% to about 65% and in a machine direction in a range of about 60% to about 90%, and
   wherein a dart impact strength of the shrink-wrap packaging film is in a range of about 300 grams to about 1000 grams.

2. A shrink-wrap packaging film according to claim 1, wherein the polyolefin is selected from a group consisting of non-linear ethylene homopolymers, non-linear ethylene ethyl acetate copolymers, and non-linear ethylene vinyl acetate copolymers; and wherein the elastomer comprises a styrene butadiene copolymer.

3. A shrink-wrap packaging film according to claim 1, wherein the polyolefin is selected from the group consisting of non-linear polyethylene and polypropylene; and wherein the elastomer comprises a styrene butadiene copolymer.

4. A shrink-wrap packaging film according to claim 1, wherein the elastomer comprises at least one of polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, and methyl methacrylate alkyl acrylate butadiene styrene copolymer.

5. A shrink-wrap packaging film according to claim 1, wherein the polyolefin comprises at least one of non-linear polyethylene homopolymer, polypropylene homopolymer, propylene/ethylene copolymer, non-linear ethylene ethyl acetate copolymers and non-linear ethylene vinyl acetate copolymers.

6. A shrink-wrap packaging film according to claim 1, wherein the overall gauge thickness of the shrink-wrap packaging film is in a range of about 0.5 mil to about 3 mil.

7. A shrink-wrap packaging film according to claim 1, wherein a haze of the shrink-wrap packaging film is in a range of about 1% to about 10% and a 45 degree gloss of the shrink-wrap packaging film is in a range of about 70% to about 110%.

8. A shrink-wrap packaging film according to claim 1, wherein a tensile modulus of the shrink-wrap packaging film is in a range of about 50,000 psi to about 120,000 psi.

9. A shrink-wrap packaging film according to claim 8, wherein a tensile strength of the shrink-wrap packaging film is in a range of about 2000 psi to about 3500 psi.

10. A shrink-wrap packaging film according to claim 1, wherein the first layer is in a range of between about 10% to about 25% of an overall thickness of the shrink-wrap packaging film and the second layer is in a range of between about 50% to about 80% of the overall thickness of the shrink-wrap packaging film.

11. A shrink-wrap packaging film comprising:
   a first layer of a sheet of elastomer in a range of between about 2.5% to about 27.5% of an overall thickness of the shrink-wrap packing film;
   a second layer of polyolefin comprising at least one of non-linear ethylene ethyl acetate copolymers, non-linear ethylene vinyl acetate copolymers, non-linear ethylene homopolymers, polypropylene homopolymers and propylene/ethylene copolymers, the second layer having a first surface abuttingly contacting a first surface of the first layer of the sheet of elastomer, wherein the second layer is in a range of between about 45% to about 95% of the overall thickness of the shrink-wrap packaging film; and
   a third layer of a sheet of elastomer abuttingly contacting a second surface of the second layer of polyolefin so that the second layer of polyolefin is positioned between the first and third layers of elastomer, wherein the third layer is in a range of between about 2.5% to about 27.5% of the overall thickness of the shrink-wrap packaging film, wherein the shrink-wrap packaging film is configured to shrink in a transverse direction in a range of about 10% to about 65% and in a machine direction in a range of about 60% to about 90%, wherein the shrink-wrap packaging film has a tensile modulus in a range of about 50,000 psi to about 120,000 psi and has a tensile strength in a range of about 2000 psi to about 3500 psi, and wherein the shrink-wrap packaging film is configured for use in shrink bundling applications without use of a cross-linking process.

12. A shrink-wrap packaging film according to claim 11, wherein the elastomer comprises a styrene butadiene copolymer, the polyolefin is selected from the group consisting of non-linear ethylene homopolymers, non-linear ethylene ethyl acetate copolymers and non-linear ethylene vinyl acetate copolymers; and wherein the increase in modulus allows the shrink-wrap packaging film to be readily usable with packaging machinery at relatively high speeds and provides shrink-wrap packaging film having preselected optical and mechanical properties.

13. A shrink-wrap packaging film according to claim 12, wherein the elastomer comprises at least one of polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, and methyl methacrylate alkyl acrylate butadiene styrene copolymer.

14. A shrink-wrap packaging film according to claim 13, wherein the polyolefin comprises at least one of non-linear polyethylene homopolymer, polypropylene homopolymer, propylene/ethylene copolymer, non-linear ethylene ethyl acetate copolymers and non-linear ethylene vinyl acetate copolymers.

15. A shrink-wrap packaging film according to claim 11, wherein the shrink-wrap packaging film has a haze in a range of about 1% to about 10%.

16. A shrink-wrap packaging film according to claim 15, wherein the packaging film has a 45 degree gloss in a range of about 70% to about 110%.

17. A shrink-wrap packaging film according to claim 11, wherein the shrink-wrap packaging film has a film gauge thickness in a range of about 0.5 to about 3 mils.

18. A shrink-wrap packaging film according to claim 11, wherein the shrink-wrap packaging film has a dart impact strength in a range of about 300 grams to about 1000 grams.

19. A shrink-wrap packaging film comprising: a first layer comprising a sheet of an elastomer in a range of between about 2.5% to about 27.5% of an overall thickness of the shrink-wrap packing film; a second layer of a polyolefin comprising at least one of non-linear ethylene ethyl acetate copolymers having a density greater than 0.920 grams per cubic centimeter, non-linear ethylene homopolymers having a density greater than 0.920 grams per cubic centimeter, and non-linear ethylene vinyl acetate copolymers having a density greater than 0.920 grams per cubic centimeter, the second layer having a first surface abuttingly contacting a first surface of the first layer, wherein the second layer is in a range of between about 45% to about 95% of the overall thickness of the shrink-wrap packaging film; and a third layer comprising a sheet of an elastomer, the third layer abuttingly contacting a second surface of the second layer such that the second layer is positioned between the first and third layers, wherein the third layer is in a range of between about 2.5% to about 27.5% of the overall thickness of the shrink-wrap packaging film, wherein the shrink-wrap packaging film is configured to shrink in a transverse direction in a range of about 10% to about 60% and in a machine direction in a range of about 60% to about 90%, wherein the shrink-wrap packaging film has a haze in a range of about 1% to about 10% and has a 45 degree gloss in a range of about 70% to about 110%, and wherein the shrink-wrap packaging film is configured for shrink bundling without use of a cross-linking process.

20. A shrink-wrap packaging film according to claim 19, wherein the elastomer comprises at least one of polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, and methyl methacrylate alkyl acrylate butadiene styrene copolymer.

21. A shrink-wrap packaging film comprising: a first layer comprising a sheet of an elastomer in a range of between about 2.5% to about 27.5% of an overall thickness of the shrink-wrap packing film; a second layer of a polyolefin comprising at least one of non-linear ethylene ethyl acetate copolymers having a density greater than 0.920 grams per cubic centimeter, non-linear ethylene homopolymers having a density greater than 0.920 grams per cubic centimeter, and non-linear ethylene vinyl acetate copolymers having a density greater than 0.920 grams per cubic centimeter, the second layer having a first surface abuttingly contacting a first surface of the first layer, wherein the second layer is in a range of between about 45% to about 95% of the overall thickness of the shrink-wrap packaging film; and a third layer comprising a sheet of an elastomer, the third layer abuttingly contacting a second surface of the second layer such that the second layer is positioned between the first and third layers, wherein the third layer is in a range of between about 2.5% to about 27.5% of the overall thickness of the shrink-wrap packaging film, wherein the shrink-wrap packaging film is configured to shrink in a transverse direction in a range of about 10% to about 60% and in a machine direction in a range of about 60% to about 90%, upon application thereto of a sufficient amount of heat and wherein the shrink-wrap packaging film is has a dart impact strength in a range of about 300 grams to about 1000 grams and wherein the shrink-wrap packaging film is configured for shrink bundling without use of a cross-linking process.

22. A shrink-wrap packaging film according to claim 21, wherein the elastomer comprises at least one of polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, and methyl methacrylate alkyl acrylate butadiene styrene copolymer.

23. A shrink-wrap packaging film according to claim 21, wherein the shrink-wrap packaging film has a haze in a range of about 1% to about 10% and a 45 degree gloss in a range of about 70% to about 110%.

* * * * *

UNITED STATES PATENT AND TRADEMARK OFFICE
CERTIFICATE OF CORRECTION

| | | |
|---|---|---|
| PATENT NO. | : 7,582,341 B2 | Page 1 of 1 |
| APPLICATION NO. | : 11/352066 | |
| DATED | : September 1, 2009 | |
| INVENTOR(S) | : Rodney L. Pettis | |

It is certified that error appears in the above-identified patent and that said Letters Patent is hereby corrected as shown below:

Column 2, Line 6 reads, "...describes a structurally sysmentrical multilayer film..." which should read, "...describes a structurally symmetrical multilayer film..."

Column 5, Line 20 reads, "...for of a plurality of tested film samples..." which should read, "...for a plurality of tested film samples..."

Column 8, Line 16 reads, "...used in the first in third layer..." which should read, "...used in the first and third layers..."

Column 11, Lines 24-26 read, "...so that for a selected overall packaging film gauge a thickness as shown in FIG. 15." which should read, "...for a selected overall packaging film gauge a thickness is shown in FIG. 15."

Column 12, Line 2 reads, "...a film gauge thickness is in a range of..." which should read, "...a film gauge thickness in a range of..."

Column 16, Line 46 reads, "...film is has a dart impact..." which should read, "...film has a dart impact..."

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,582,341 B2  Page 1 of 1
APPLICATION NO. : 11/352066
DATED : September 1, 2009
INVENTOR(S) : Rodney L. Pettis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 328 days.

Signed and Sealed this

Fourteenth Day of September, 2010

David J. Kappos
*Director of the United States Patent and Trademark Office*